(12) United States Patent
Bang

(10) Patent No.: US 7,772,779 B2
(45) Date of Patent: Aug. 10, 2010

(54) LAMP FOR BACKLIGHT

(75) Inventor: Ju-Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 961 days.

(21) Appl. No.: 11/155,647

(22) Filed: Jun. 20, 2005

(65) Prior Publication Data

US 2006/0145619 A1     Jul. 6, 2006

(30) Foreign Application Priority Data

Dec. 30, 2004   (KR) .................. 10-2004-0116922

(51) Int. Cl.
*H01J 65/00* (2006.01)
(52) U.S. Cl. ..................... 313/594; 313/607
(58) Field of Classification Search ........... 313/594, 313/607
See application file for complete search history.

(56) References Cited

U.S. PATENT DOCUMENTS

| | | | | |
|---|---|---|---|---|
| 5,514,934 A | * | 5/1996 | Matsumoto et al. ......... | 313/607 |
| 5,592,047 A | * | 1/1997 | Park et al. ................. | 313/607 |
| 5,850,122 A | * | 12/1998 | Winsor ..................... | 313/631 |
| 6,094,015 A |   | 7/2000 | Wessels et al. | |
| 6,331,064 B1 | | 12/2001 | Nishiyama et al. | |
| 2003/0098643 A1 | | 5/2003 | Park et al. | |
| 2003/0231512 A1 | | 12/2003 | Bang et al. | |
| 2004/0125599 A1 | * | 7/2004 | Takeda et al. .............. | 362/263 |

FOREIGN PATENT DOCUMENTS

| | | |
|---|---|---|
| EP | 0 518 132 A2 | 12/1992 |
| EP | 0 518 132 A3 | 12/1992 |
| EP | 0 593 311 | 4/1994 |
| EP | 1 316 987 | 6/2003 |
| JP | 8-273604 | 10/1996 |
| JP | 11-317201 | 11/1999 |
| JP | 2001-155689 | 6/2001 |
| JP | 2003-91007 | 3/2003 |

OTHER PUBLICATIONS

Search Report issued by the French Patent Office on Aug. 8, 2006.

* cited by examiner

*Primary Examiner*—Nimeshkumar D Patel
*Assistant Examiner*—Christopher M Raabe
(74) *Attorney, Agent, or Firm*—McKenna Long & Aldridge

(57) ABSTRACT

An external electrode fluorescent lamp for a backlight, including: a lamp that emits light; a first external electrode at one end of the lamp, and a second external electrode at a second end of the lamp; a dividing electrode between the first and second external electrodes and defining a plurality of divided regions; and a separating wall inside the lamp corresponding to the dividing electrode and separating the lamp into the divided regions.

11 Claims, 6 Drawing Sheets

LAMP FOR BACKLIGHT

This application claims the benefit of Korean Patent Application No. 116922/2004, filed on Dec. 30, 2004, which is hereby incorporated by reference for all purposes as is fully set forth herein.

BACKGROUND OF THE INVENTION

1. Field of the Invention

The present invention relates to a lamp for a backlight, and particularly, to an external electrode fluorescent lamp of a backlight which is appropriate for a large-area liquid crystal display device.

2. Discussion of the Related Art

With the recent development of portable electronic devices, such as mobile phones, personal digital assistants (PDAs), and notebook computers, the demand for light weight, thin, and small flat panel display devices used in portable electronic devices is increasing. Research includes active development of flat panel display devices including liquid crystal display (LCD) devices, plasma display panel (PDP) devices, field emission display (FED) devices, and vacuum fluorescent display (VFD) devices. Of these different devices, LCD devices are actively being developed due to the simple mass-production techniques available to produce them, the ease of driving them, and high picture quality.

Such LCD devices are a transmission type display devices, and they display a desired image on a screen by controlling the amount of light transmitted through a liquid crystal layer by refraction anisotropy of liquid crystal molecules. Accordingly, a backlight (a light source transmitting through the liquid crystal layer to display an image) is installed in the liquid crystal display device. In general, backlights are divided into two types.

The first is an edge-type backlight in which lamps are installed at the side of a liquid crystal display (LCD) panel and supply light to the liquid crystal layer. The second is a direct-type backlight in which lamps installed under the LCD panel directly supply light thereto.

The edge-type backlight is installed at the side of the LCD panel and may supply light to the liquid crystal layer through a reflector and a light guide plate. Thus, the thickness of the LCD panel may be reduced, and therefore, the edge-type backlight is mainly used in the notebooks requiring thin display devices. However, because the edge-type backlight has lamps located at the side of the LCD panel, it is hard to use the edge-type backlight in a large LCD panel and to obtain high brightness because light is supplied through the light guide side. Accordingly, the edge-type backlight is not appropriate for an LCD panel for a large LCD televisions which have recently increased in popularity.

The direct-type backlight may be used in a large LCD panel and produce high brightness levels because light emitted from the lamps is supplied directly to the liquid crystal layer. Thus, the direct-type backlight is mainly used to fabricate LCD panels for LCD televisions.

FIG. 1 is a view schematically illustrating the construction of a liquid crystal display device to which a direct-type backlight is applied in accordance with the related art. As illustrated therein, a liquid crystal display (LCD) device 1 includes a liquid crystal display (LCD) panel 3 and a backlight 10 installed at the back of the LCD panel 3. It is the LCD panel 3 where an image is displayed. The LCD panel 3 includes a transparent lower substrate 3a, a transparent upper substrate 3b, such as glass, and a liquid crystal layer (not illustrated) formed therebetween. In particular, though not illustrated in the drawing, the lower substrate 3a is a TFT substrate on which a driving device such as a thin film transistor and a pixel electrode are formed, and the upper substrate 3b is a color filter substrate on which a color filter layer is formed. In addition, a drive circuit unit 5 is on the side of the lower substrate 3a and supplies signals to the thin film transistor and the pixel electrode that are formed on the lower substrate 3a.

The backlight 10 includes a plurality of lamps 11 for supplying light to the LCD panel 3, a reflector 17 reflecting the light emitted from the lamps 11 and improving light efficiency, and an optical sheet 15 diffusing the light emitted from the lamps 11 and making the diffused light incident upon the LCD panel 3.

The direct-type backlight will be described in detail with reference to FIG. 2. As illustrated in FIG. 2, the direct-type backlight 10 includes a lower case 21, a reflector 17 above the lower case 21 reflecting light emitted from the lamps 11, a lamp fixing unit 24 installed above the reflector 17 and fixing the lamps 11, a side supporting unit 26 installed at both sides of the lamp fixing unit 24 and supporting the lamp fixing unit 24, a diffusion plate 15a and a plurality of diffusion sheets 15b and 15c above the lamps 11 diffusing the light emitted from the lamps 11 and supplying uniform light to the LCD panel, and an upper case 28 installed above the diffusion sheets 15b and 15c.

In general, a cold cathode fluorescent lamp (CCFL) is used as the lamp, but the CCFL is operated at high brightness of about 30,000 cd/m$^2$, and the life span of the lamps is short. A CCFL may be used in not only a direct-type backlights but also the edge-type backlights. However, when the CCFL is used in the edge-type backlight, because brightness is low, it is not appropriate for a panel for a large-screen. In addition, when the CCFL is used in the direct-type backlight, because the an interval between the lamps needs to be enlarged in order to maintain proper brightness of the LCD panel, a reflector having a special structure is required and also the distance between the diffusion plate and the lamps becomes great to thereby increase the LCD panel in thickness.

Accordingly, there remains a need for a backlight that has a long life span, high brightness level, and high efficiency for a large-screen LCD device. An external electrode fluorescent lamp (EEFL) has been developed to meet such a demand.

The EEFL has external electrodes at both ends and is turned on by supplying continuous high-frequency voltages or high-frequency voltages in the form of pulses to the external electrodes. Such an EEFL is illustrated in FIG. 3.

As illustrated in FIG. 3, light is emitted from the EEFL when both ends of a fluorescent lamp 11 are inserted into cap-shaped external electrodes 21 and fluorescent materials emit light by electric discharge inside the fluorescent lamp 11 according to high-frequency voltages being supplied to the EEFL.

As the LCD panel increases in size, the fluorescent lamp 11 increases in length. For LCD panels of more than 30 to 40", the length of the lamp will exceed 700 mm. As the lamp increases in length, brightness becomes non-uniform, and when turning on the lamp, a high lamp voltage is required.

Thus, stability problems occur and image quality is deteriorates according to electrical effects of a driving circuit of the LCD panel.

SUMMARY OF THE INVENTION

Accordingly, the present invention is directed to a lamp for a backlight that substantially obviates one or more of the problems due to limitations and disadvantages of the related art.

An advantage of the present invention is to provide a lamp for a backlight which is appropriate for a large-area liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an external electrode fluorescent lamp for a backlight, including: a lamp that emits light; a first external electrode at one end of the lamp, and a second external electrode at a second end of the lamp; a dividing electrode between the first and second external electrodes and defining a plurality of divided regions; and a separating wall inside the lamp corresponding to the dividing electrode and separating the lamp into the divided regions.

In another aspect of the present invention, an external electrode fluorescent lamp for a backlight, includes: a lamp that emits light; a plurality of external electrodes defining at least two divided regions in the lamp; and at least one separating wall formed at the inside of the lamp corresponding to one of the electrodes and separating the lamp into the divided regions.

In another aspect of the present invention, an external electrode fluorescent lamp for a backlight, including: a plurality of lamps that emit light arranged parallel to one another; external electrodes formed at both ends of each of the lamps; dividing electrodes dividing each lamp into at least two divided regions; separating walls formed inside each of the lamps corresponding to the dividing electrodes; and a plurality of common electrodes that connect the external electrodes and the divided electrodes of the lamps of each unit in common.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Figure 1:
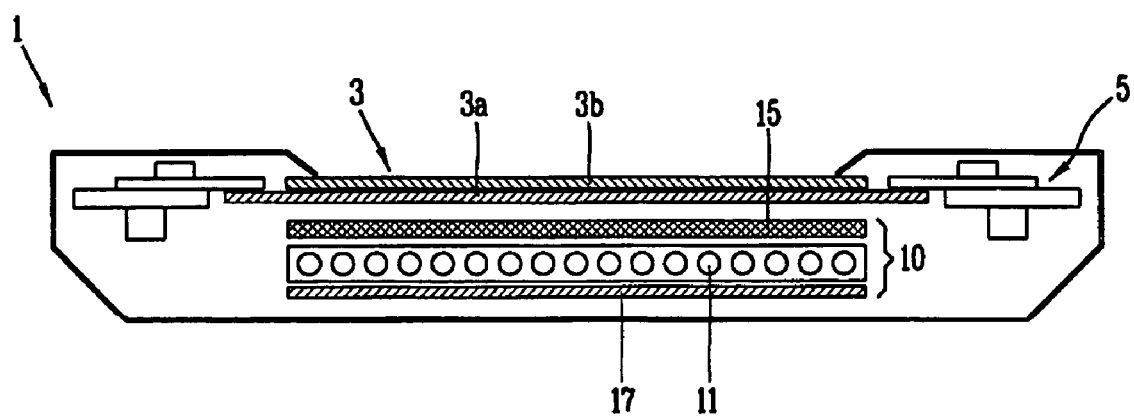
FIG. 1 illustrates a liquid crystal display device to which a direct-type backlight in accordance with the related art is applied.
Figure 2:
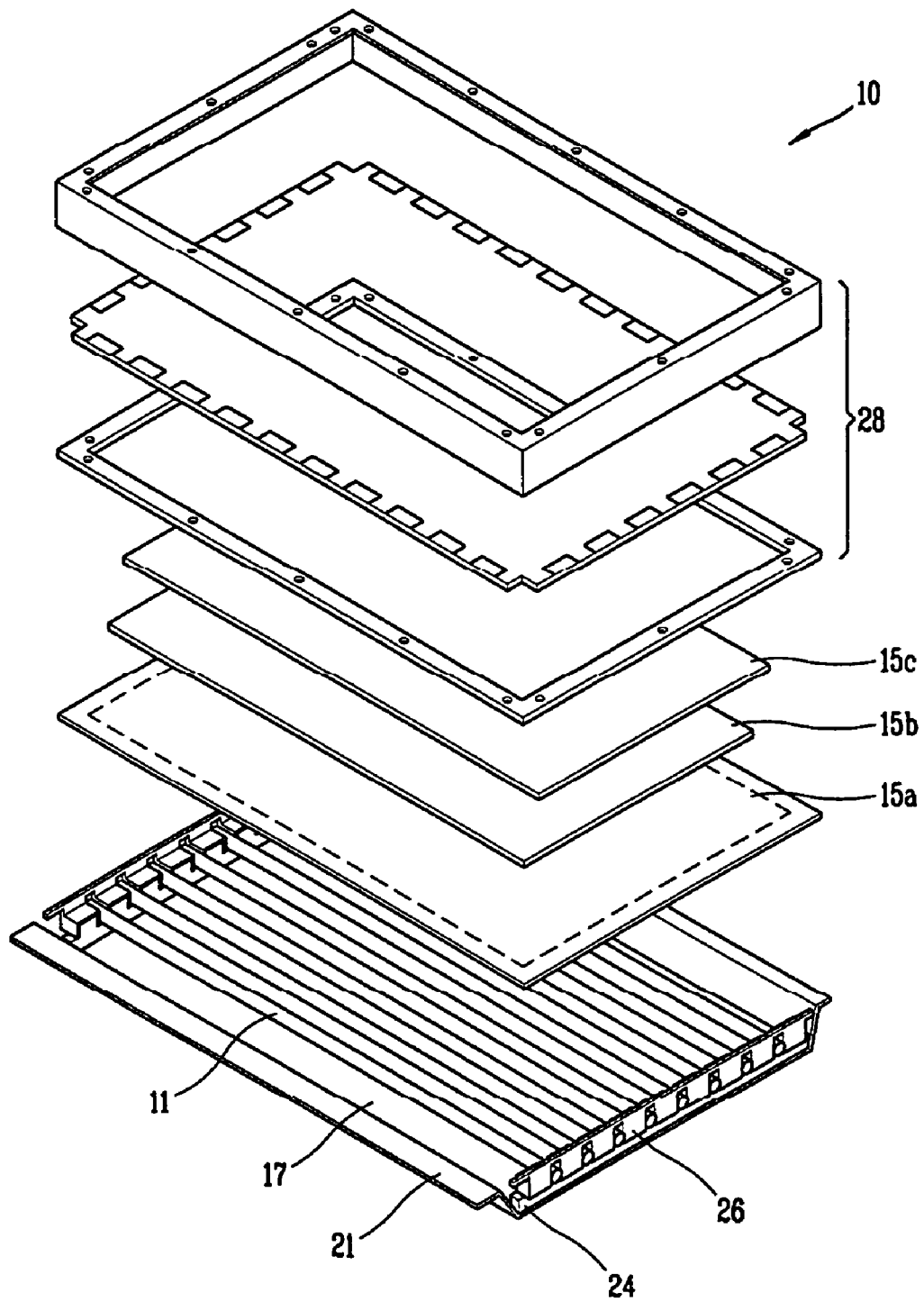
FIG. 2 is an exploded perspective view illustrating a structure of the direct-type backlight in accordance with the related art.
Figure 3:
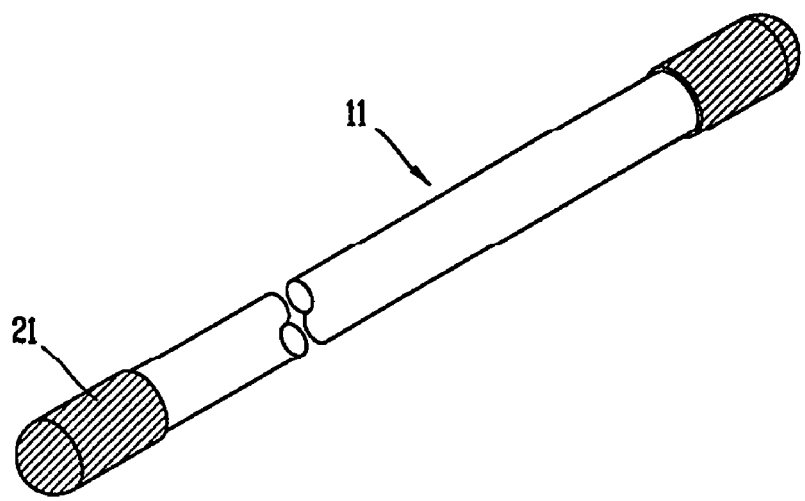
FIG. 3 is a perspective view of an external electrode fluorescent lamp in accordance with the related art.
Figure 4:
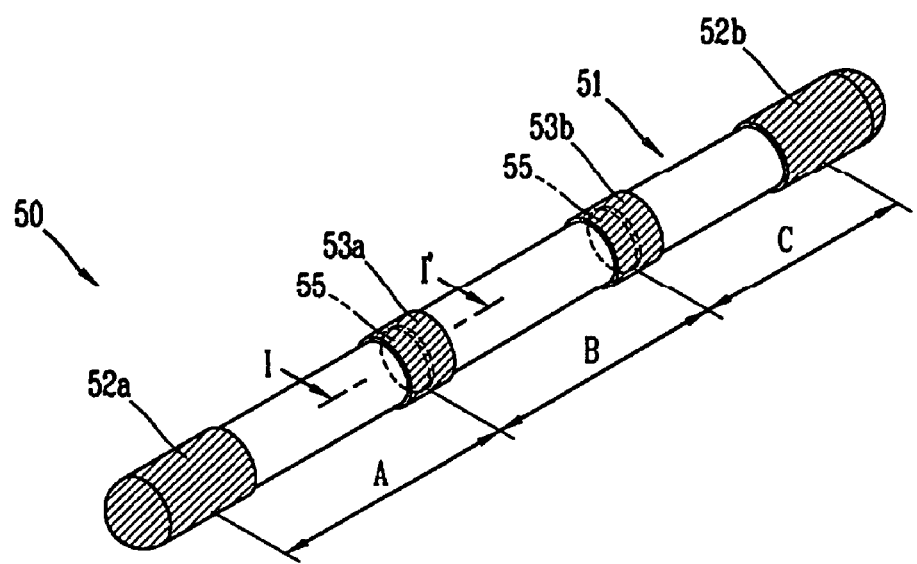
FIG. 4 is a perspective view of an external electrode fluorescent lamp in accordance with the present invention.
Figure 5:
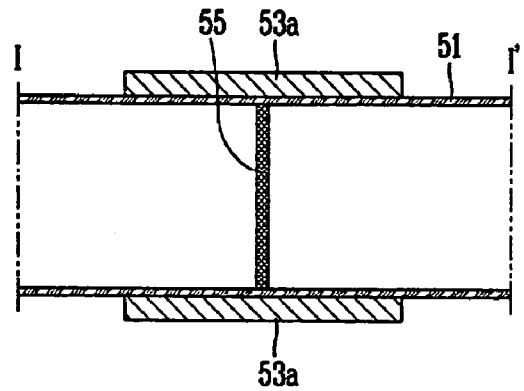
FIG. 5 is a cross-sectional view taken along line I-I' of FIG. 4.

FIGS. 4 and 5 illustrate an external electrode fluorescent lamp (EEFL) in accordance with the present invention. FIG. 4 is a side view and FIG. 5 is a cross-sectional view taken along line I-I' of FIG. 4.

An EEFL 50 according to the present invention includes a lamp 51 for emitting light using fluorescent substances applied to its entire inner circumferential surface, and a plurality of electrodes 52a, 52b, 53a and 53b formed along an outer circumferential surface of the lamp 51 for emitting light.

The electrodes include first and second external electrodes 52a and 52b formed at both ends of the lamp 51, and first and second dividing electrodes 53a and 53b formed between first and second external electrodes 52a and 52b and defining a plurality of divided regions (A, B and C) on the lamp 51. Though two dividing electrodes are illustrated in the drawing, one or more dividing electrodes may be formed.

In addition, separating walls 55 for separating the divided regions (A, B and C) are formed in the lamp 51 corresponding to the dividing electrodes 53a and 53b. A discharge gas formed of a mixture of inactive gases, Hg or the like fills in the lamp 51.

The dividing electrodes 53a and 53b are formed to reduce the lamp voltages supplied to the first and second external electrodes 52a and 52b as the lamp 51 increases in length and to solve the non-uniform brightness problem of long EEFLs. The lamp 51 may be divided into the divided regions (A, B and C) of the same length or of different lengthes.

For instance, when the lamp is divided into parts of the same length by the dividing electrodes 53a and 53b and the separating walls 55, an effect may be obtained as if lamps having one-third the length of the lamp 51 for emitting light are arranged parallel to one another. Because the lamps are reduced in length, lamp voltages supplied between the electrodes are decreased in comparison to the conventional art. That is, the first divided region (A) emits light by lamp voltages supplied to the first external electrode 52a and the first dividing electrode 53a, the second divided region (B) emits light by lamp voltages supplied to the first dividing electrode 53a and the second external electrode 53b, and the third divided region (C) emits light by lamp voltages supplied to the second dividing electrode 53b and the second external electrode 52b. Here, because an interval between the electrodes corresponds to one-third the length of the conventional lamp, the same brightness results, but lamp voltages supplied between them is reduced in comparison to the conventional art.

Because the present invention reduces the lamp voltage required and the lamp length, entirely uniform brightness across the display may be implemented. The lamp voltages supplied to the respective electrodes should have a 180° phase difference between neighboring electrodes. That is to say, the lamp voltages supplied to the first external electrode 52a and the first dividing electrode 53a have a 180° phase difference, and the lamp voltages supplied to the first dividing electrode 53a and the second external electrode 53b also have a 180° phase difference.

Accordingly, the first external electrode 52a and the second dividing electrode 53b have the same lamp voltage phases, and the first dividing electrode 53a and the second external electrode 52b have the same lamp voltage phases. The first external electrode 52a and the second external electrode 52b and the first dividing electrode 53a and the second dividing electrode 53b are connected to one converter, and thus brightness of the respective divided regions (A, B and C) is equalized, thereby controlling brightness across the entire lamp. Also, brightness according to each divided region may be controlled by connecting the first external electrode 52a and the first dividing electrode 53a to a first inverter and the second dividing electrode 53b and the second external electrode 52b to a second inverter.

Figure 6:
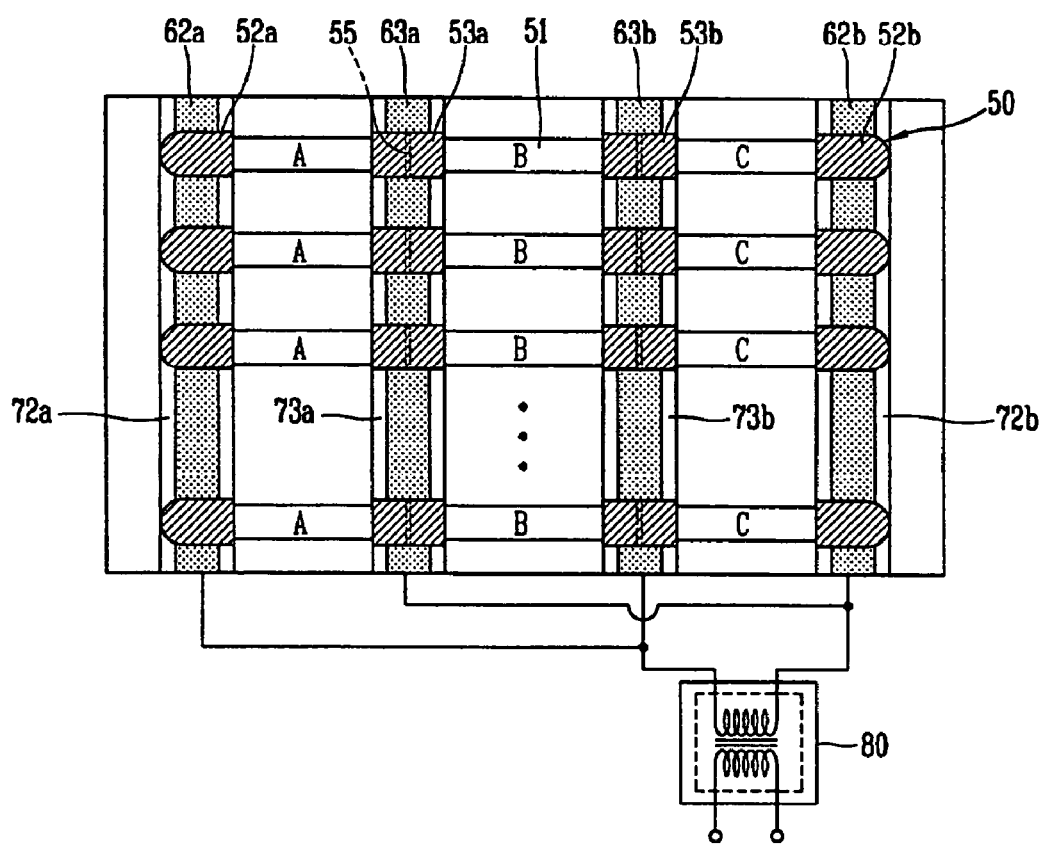
FIG. 6 is a view illustrating an example that the external electrode fluorescent lamps of the present invention are applied to a light emitting unit of the backlight.
Figure 7:
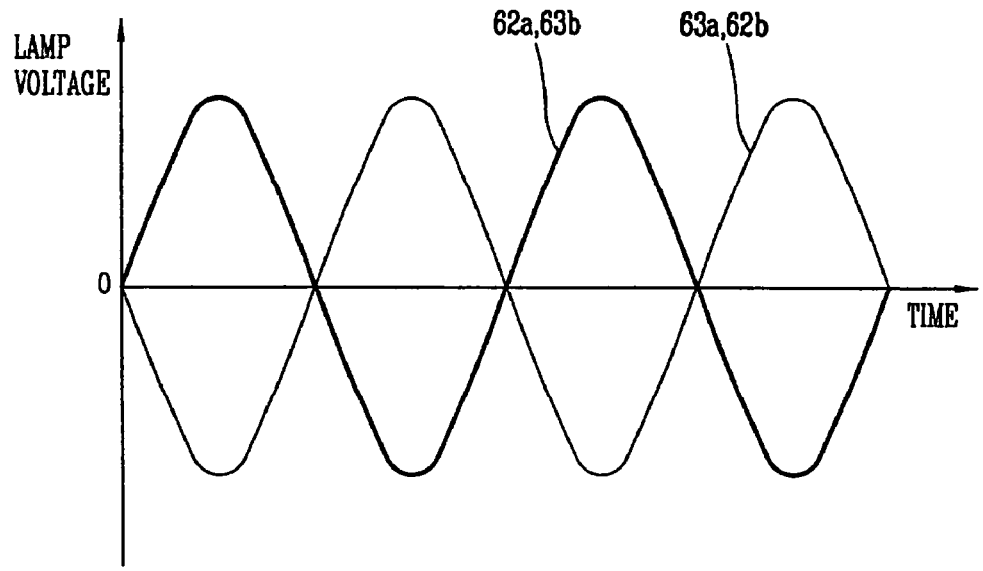
FIG. 7 is a view illustrating a waveform of a lamp voltage supplied to a common electrode of FIG. 6.

FIG. 6 shows an example in which EEFLs of the present invention illustrated in FIG. 5 are used in a direct-type backlight, in particular, a lamp for emitting light of the backlight allowing the control of brightness across the entire display. FIG. 7 shows a waveform of a lamp voltage supplied to the EEFL.

In the direct-type backlight in accordance with the present invention, a plurality of EEFLs are arranged parallel to one another at regular intervals. As described in FIG. 5, the EEFL 50 includes: a lamp 51 emitting light with fluorescent substances applied to an inner circumferential surface; the first and second external electrodes 52a and 52b formed along an outer circumferential surface at both ends of the lamp 51; and the first and second dividing electrodes 53a and 53b formed between the first external electrode 52a and the second external electrode 52b and defining a plurality of divided regions. The separating wall 55 is formed inside the lamp corresponding to each of dividing electrodes. In addition, the separating wall 55 may be located at a position bisecting the dividing electrode.

The EEFLs 50 are arranged at regular intervals in the backlight. Here, common electrodes 62a, 62b, 63a, and 63b are at the same position in each of the lamps, and the common electrodes 62a, 62b, 63a, and 63b are supplied with lamp voltages through an inverter 80.

The first external electrodes 52a are connected in common by a first common electrode 62a formed on a lower member 72a, and the first dividing electrodes 53a are connected in common to a second common electrode 63a formed on a second lower member 73a. In addition, the second dividing electrodes 53b are connected in common by a third common electrode 63b formed on a third lower member 73b, and the second external electrodes 52b are connected in common by a fourth common electrode 62b formed on a fourth lower member 72b.

In addition, the first and third common electrodes 62a and 63b are connected in common, and the second common electrode and the fourth common electrode 63a and 62b are connected in common. The common electrodes 62a, 62b, 63a and 63b are connected to the inverter 80. The inverter includes: an oscillation unit receiving power and generating an alternating current; a transformation unit boosting the alternating current generated from the oscillation unit and supplying the boosted alternating current to the lamp via the common electrodes; and a lamp controlling unit supplying uniform power to the lamps. Only the transformation unit is illustrated in the drawing.

Lamp voltages supplied to the first and third common electrodes 62a and 63b through the inverter 80, and lamp voltages supplied to the second and fourth common electrodes 63a and 62b have a 180° phase difference. Accordingly, as shown in FIG. 7, the electrodes adjacent to each other are supplied with lamp voltages having a 180° phase difference. That is, the first and third common electrodes 62a and 63b are supplied with a sine wave lamp voltage, and the second and fourth common electrodes 63a and 62b are supplied with a lamp voltage (lamp voltages having a 180° phase difference) symmetrical to the first and third common electrodes 62a and 63b on the basis of ground voltage (0).

Though the lamp voltage waveform is expressed only as a sine waveform in the drawing, various waveforms such as a transformed sine waveform, a pulse waveform and a transformed pulse waveform may be used.

As described, when the first and third common electrodes and the second and fourth common electrodes are connected to the inverter, because lamp voltages supplied to each of divided regions are the same, the lamp displays uniform brightness. By controlling the size of the lamp voltages supplied through the inverter, brightness may be controlled.

Meanwhile, the brightness of each divided region may be controlled by supplying different lamp voltages thereto by connecting the first common electrode and the third common electrode to the first inverter and connecting the second common electrode and the fourth common electrode to the second inverter.

Figure 8:
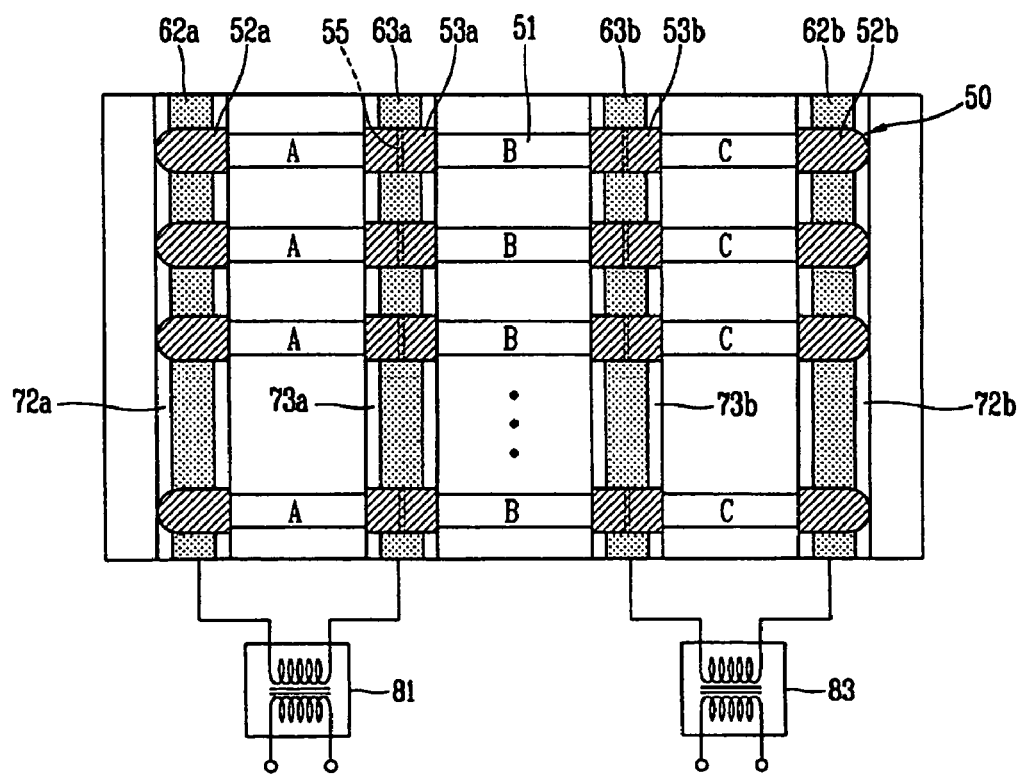
FIG. 8 is a view illustrating another example that the external electrode fluorescent lamps of the present invention are, applied to the light emitting unit of the backlight.
Figure 9:
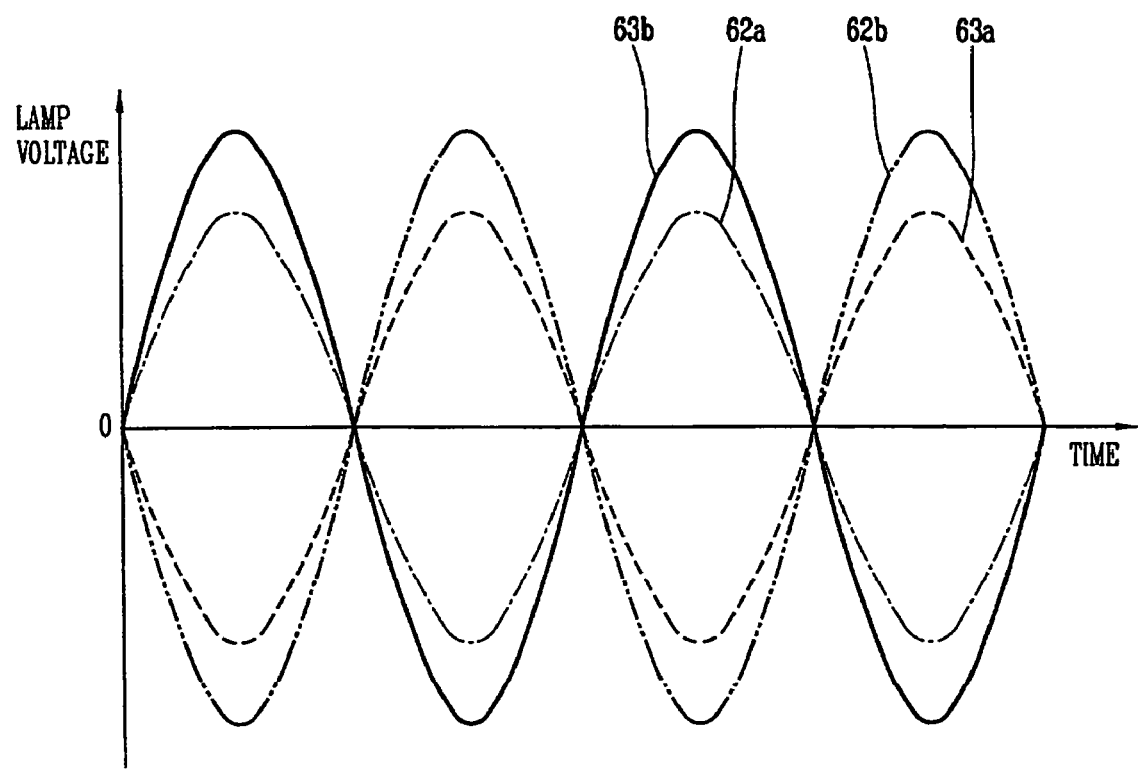
FIG. 9 is a view illustrating a waveform of a lamp voltage supplied to the common electrode of FIG. 8.

FIG. 8 illustrates a lamp of the backlight allowing the control of brightness according to location in the lamp. FIG. 9 shows a waveform of lamp voltages supplied to the lamp. The construction of the lamp illustrated in FIG. 8 is the same as that of FIG. 6 except for the inverter. Accordingly, a description of items with the same reference numerals will be omitted.

As illustrated in the drawing, the first and second common electrodes 62a and 63a are connected to the first inverter 81, and the third and fourth common electrodes 63b and 62b are connected to the second inverter 83. Here, lamp voltages with the same value may be supplied to the first and the second inverters 81 and 83. However, in order to control brightness among the divided regions, different values of lamp voltages may be supplied thereto. The neighboring electrodes should be supplied with lamp voltages having a 180° phase difference.

As illustrated in FIG. 9, a lamp voltage of a sine wave is supplied to the first common electrode 62a through the first inverter 81, and a lamp voltage (a lamp voltage having a 180° phase difference) symmetrical to the first common electrode 62a on the basis of ground voltage (0) is supplied to the second common electrode 63a. In addition, a lamp voltage of a sine wave is supplied to the third common electrode 63b through the second inverter 83 and a lamp voltage (lamp voltage having a 180° phase difference) symmetrical to the third common electrode 63b on the basis of ground voltage (0) is supplied to the fourth common electrode 62b. Every odd numbered common electrode and every even numbered common electrode are supplied with lamp voltages having a 180° phase difference as compared to a ground line. In addition, brightness in each of the regions may be individually controlled by supplying a first lamp voltage from the first inverter 81 and a second lamp voltage supplied from the second inverter 83. When the second lamp voltage supplied through the second inverter 83 is greater than the first lamp voltage supplied through the first inverter 81, the brightness of the third divided region (C) is set higher than that of the first divided region (A). Brightness of the second divided region (B) is determined by a difference between the first lamp voltage supplied from the first inverter 81 and the second lamp voltage supplied from the second inverter 83. The greater the difference between the first lamp voltage and the second lamp voltage, the more the brightness of the second divided region (B) increases.

The present invention comprising the EEFL reduces the lamp voltage and implements uniform brightness by forming dividing electrodes defining a plurality of divided regions of the lamp between external electrodes formed at both ends of the lamp.

Furthermore, the present invention allows complete division by installing separating walls for separating the lamp at the edge of the divided regions and eliminating effects between the neighboring divided regions.

In addition, the present invention allows the control of brightness according to regions by supplying lamp voltages having a 180° phase difference between neighboring electrodes and connecting two electrodes to one inverter. When the brightness of a plurality of divided regions defined by the dividing electrodes is driven by different inverters, the brightness may be set differently in each divided region by supplying different lamp voltages thereto.

The lamp may be divided into divisions of different sizes and shapes between the ends of the EEFL, and separating walls may be formed inside the lamp corresponding to the dividing electrodes. For example, the lamp may be changed into shapes such as "U", "W" or "-".

In addition, the dividing electrodes may divide the lamp into divided regions with the same width or different width. When the divided regions have different widths, dividing electrodes between neighboring lamps may be formed in a zigzag shape. When the dividing electrodes are formed in the zigzag shape, the common electrodes connecting the dividing electrodes in common may be formed in a zigzag shape.

According to the present invention in an EEFL used as a backlight, the lamp is reduced in length and uniform brightness may be implemented regardless of the size of an LCD panel by forming dividing electrodes for emitting light from a plurality of divided regions between both ends of the lamp and by installing separating walls at the inside of the lamp corresponding to the dividing electrodes.

In accordance with the present invention, by connecting two electrodes as a pair to one inverter, the panel brightness may be partially controlled according to locations of the lamp.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An external electrode fluorescent lamp for a backlight, comprising:
    a tube shaped lamp that emits light, the tube shaped lamp being extended in one direction;
    a first external electrode at one end of the lamp, and a second external electrode at a second end of the lamp, the first and second external electrodes surrounding the outer circumference of the lamp;
    a dividing electrode between the first and second external electrodes and defining a plurality of divided regions, the dividing electrode surrounding the outer circumference of the lamp; and
    a separating wall inside the lamp corresponding to the dividing electrode and separating the lamp into the divided regions,
    wherein the dividing electrode covers continuously the separating wall and partial areas of two divided regions at the both sides of the separating wall.

2. The lamp of claim 1, wherein the first and second external electrodes and the dividing electrode are connected to one inverter.

3. The lamp of claim 1, wherein the tube shaped lamp is disposed in "U"-shape.

4. The lamp of claim 1, wherein he tube shaped lamp is disposed in "W"-shape.

5. The lamp of claim 1, wherein the tube shaped lamp is disposed in "-"-shape.

6. The lamp of claim 1, wherein lamp voltages are supplied to neighboring external electrode and dividing electrode with a 180° phase difference.

7. The lamp of claim 1, wherein the separating wall is at the center of the dividing electrode and bisects the dividing electrode.

8. An external electrode fluorescent lamp for a backlight, comprising:
    a plurality of lamps that emit light arranged parallel to one another;
    external electrodes formed at both ends of each of the lamps, the external electrodes being formed in a cap shape so that the both end of the lamp are inserted into the external electrodes;
    dividing electrodes dividing each lamp into a first divided region and a second divided region;
    separating walls formed inside each of the lamps corresponding to the dividing electrodes;
    a plurality of common electrodes that connect the external electrodes and the divided electrodes of the lamps of each unit in common; and
    a first inverter and a second inverter connected respectively to the common electrodes to supply the lamp voltage to the external electrodes and the dividing electrodes of the first and second divided regions, the different lamp voltage supplied to the common electrode from the first inverter being different from that of the second inverter so that the lamp voltage applied to the first divided region of the lamp has different value from that applied to the second divided region of lamp,
    wherein the dividing electrode covers continuously the separating wall and partial areas of two divided regions at the both sides of the separating wall.

9. The lamp of claim 8, wherein the dividing electrodes are at the same position in each of the lamps.

10. The lamp of claim 8, wherein the dividing electrodes are arranged in a zigzag shape with respect to the neighboring lamps and the common electrodes along the respective dividing electrodes also have a zigzag shape.

11. The lamp of claim 8, wherein the external electrodes and the dividing electrodes are supplied with lamp voltages with a 180° phase difference between the neighboring electrodes through the common electrodes.

* * * * *